Jan. 13, 1970

R. L. WEBER ETAL 3,489,435

FUEL LINE FITTING

Filed Feb. 7, 1968

INVENTORS
ROBERT L. WEBER
GEORGE E. OLSON

BY

ATTORNEYS

United States Patent Office 3,489,435
Patented Jan. 13, 1970

3,489,435
FUEL LINE FITTING
Robert L. Weber and George E. Olson, Lacon, Ill., assignors to Caterpillar Tractor Co., Peoria, Ill., a corporation of California
Filed Feb. 7, 1968, Ser. No. 703,767
Int. Cl. F16l 55/00; F02b 3/10
U.S. Cl. 285—13                                    2 Claims

ABSTRACT OF THE DISCLOSURE

A fuel line fitting for a high pressure fuel line in which the conical ends of the fuel lines are held against complementary conical surfaces on an adapter, by means of a shoulder or collar on the lines, against which a threaded member is tightly drawn by complementary threads on the adapter. A passage to the atmosphere is provided so as to release fuel which leaks at the conical surfaces so that fuel oil and lube oil contamination does not occur.

---

Figure 1:
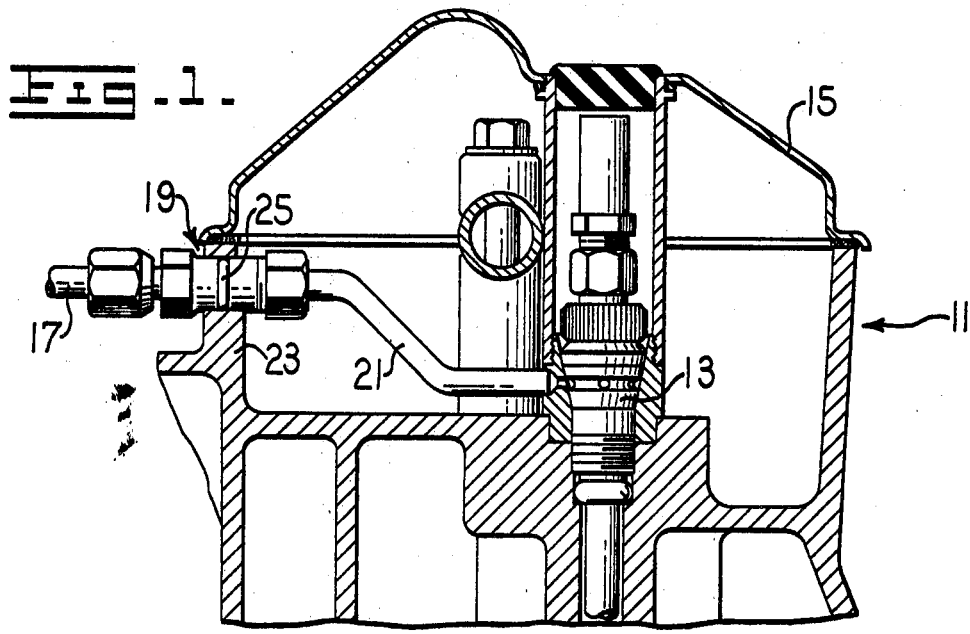

This invention relates to a fuel line fitting design which eliminates oil and fuel leakage where the fuel line passes through the wall of a cylinder head.

In engines having fuel injectors inside the valve cover, high pressure fuel lines must pass through the cylinder head wall. In many engines, this has resulted in potential lube oil leaks if proper sealing is not provided. In some of these cases, special fittings for passage of fuel through the wall have been manufactured and the lube oil leaks have been eliminated. These fittings have given rise to another problem however in that fuel may leak into the lube oil resulting in its deterioration.

In this invention, any high fuel pressure leakage is prevented from entering the cylinder head compartment and diluting the lube oil but instead is passed to the atmosphere.

It is therefore an object of this invention to provide a fuel line fitting past which engine lube oil will not escape.

It is also an object of this invention to provide a fuel line fitting from which the fuel cannot leak into the lube oil system and thereby contaminate the lube oil.

It is also an object of this invention to provide such a device which is inexpensive to manufacture and maintain and simple enough in construction that it may be disassembled and reassembled during field repair.

Other objects of the invention will be obvious when the following description and the drawing are viewed together.

Figure 2:
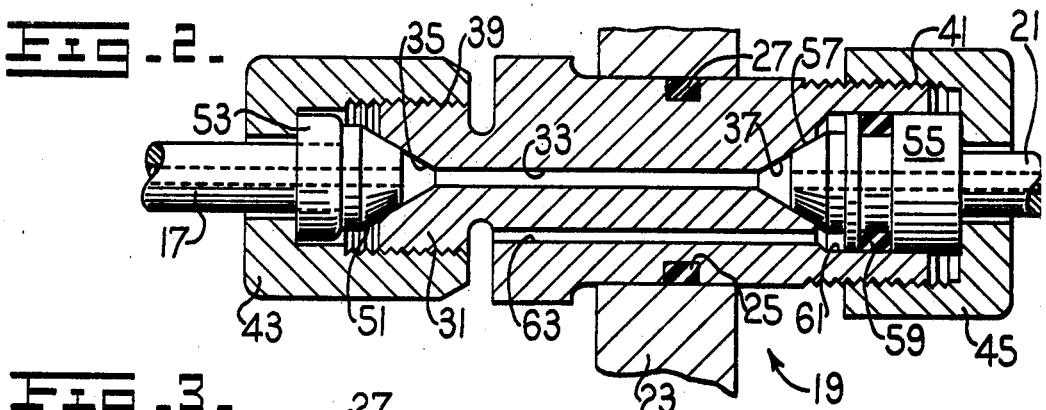
Figure 3:
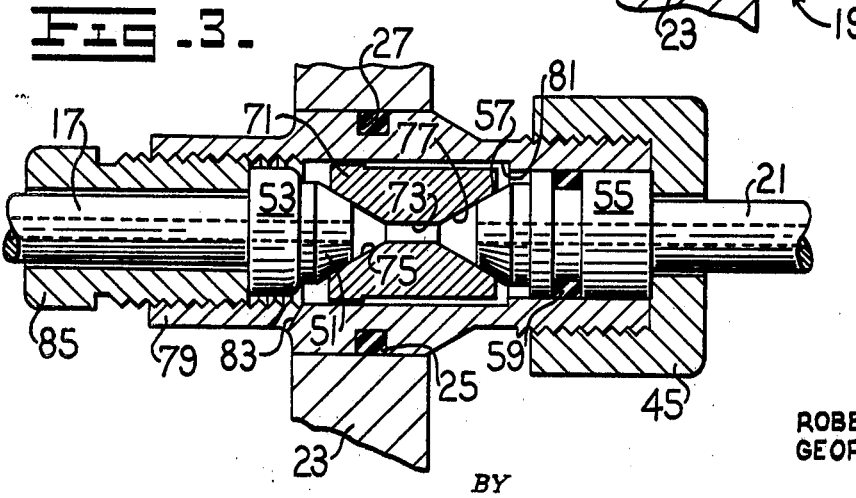

In the drawing:
FIG. 1 shows a partial view, in section, of an engine utilizing the present invention;
FIG. 2 is a longitudinal view of the invention in cross section; and
FIG. 3 shows a modification of the invention—also in longitudinal cross section.

Referring now to the drawings in greater detail, there is shown in FIG. 1 an engine 11 having a fuel injector 13 which is installed in the engine inside the valve cover 15. Fuel is delivered to the injector from a fuel line 17 through a fitting generally indicated at 19 which links line 17 with injection line 21.

The fitting 19 serving one or more injectors, passes through a wall 23 of the engine and a seal 25 mounted within a groove 27 in the fitting keeps lube oil from leaking out of the engine past the fitting.

The fitting comprises an adapter 31 having an axial passage 33 therethrough which ends in a conical counterbore 35 at one end of the adapter and a similar counterbore 37 at the opposite end. The adapter may also have external threaded sections 39 and 41 on the opposite ends thereof for receiving nuts 43 and 45.

Fuel line 17, having a conical surface 51 on the end thereof, is forced against conical surface 35 by means of a collar 53 on the line 17, against which a force is exerted by the threading of nuts 43 onto the adapter at section 39. Line 21 has a similar collar 55 which abuts nut 45 so as to draw a conical tip 57 on the line tightly against conical surface 37 of the adapter. Additionally the collar 55 also has a seal 59 suitably mounted therein so as to keep fuel from leaking between the adapter 31 and nut 45 at the threads 41.

Should fuel leak past the conical surfaces 37 and 57, it will enter the bottom of bore 61 which contains the collar 55 and thereafter pass into a passage 63 which will allow the fuel to leak from the fitting on the outside of the engine.

The modification shown in FIG. 3 has, wherever possible, been labeled with the same labels shown in FIG. 2 so that the parts which are common to both embodiments have been labeled with the same number. In this embodiment, therefore, an adapter body 71 having an axial bore 73 which ends in conical counterbores 75 and 77 is inserted within an adapter sleeve 79. Since the adapter body is relatively loose within the sleeve, it will automatically compensate for angular displacement between the lines 17 and 21 and will be held firmly in place by the conical tips of the lines when they are securely fastened to the fitting. When fuel leaks past the mating surface of the adapter body and either of the lines, it will pass into the bore 81 which contains the body and thence into a passage 83 which transfers the fuel to the outside of the engine.

A cylindrical plug member 85 is shown in FIG. 3 holding line 17 in place against the adapter body; this illustrates another method of holding the fuel line to the adapter.

Thus, a fuel line fitting which prevents leakage of lube oil of the engine while obviating the problem of lube oil contamination by fuel leaking within the engine has been provided.

We claim:
1. In an engine having a wall through which a fuel line must pass, said wall having an aperture therein, the improvement comprising:
  an adapter member slidingly fitted into said aperture and extending from a first side of said wall to a second side thereof,
  a first sealing means between said adapter and said wall intermediate the first and second sides thereof,
  a first fuel line having an external conical surface thereon entering said adapter at the end thereof adjacent said first side of said wall,
  a second fuel line having an external conical surface thereon entering said adapter at the end thereof at said second side of said wall,
  first and second internal conical surfaces within said adapter, said first and second internal conical surfaces being complementary to and receiving said first and second external conical surfaces respectively so as to result in surface-to-surface sealing contacts therebetween,
  a fuel passage in said adapter interconnecting said first and second internal conical surfaces so as to be coaxial with said first and second fuel lines,
  a leakage passage in said adapter and extending from an area adjacent said surface-to-surface seal at said other end of said adapter to an external surface on said adapter adjacent said one end of said adapter, means on said first and second fuel lines cooperating with said adapter for maintaining said fuel lines in said surface-to-surface sealing contact with said adapter, second sealing means in said contact maintenance means at said other end of said adapter for preventing leakage of fuel from said adapter on said second side of said wall, and said leakage passage communicating with said second fuel line between said second sealing means and said second internal conical surface and also with said first side of said wall.

2. The apparatus of claim 1 wherein said adapter comprises a sleeve member and a body member loosely fitted within said sleeve member and wherein said first and second internal conical surfaces and said interconnecting fuel passage are in said body member so as to provide alignment mobility between said first and second fuel lines and said adapter.

References Cited

UNITED STATES PATENTS

| | | | |
|---|---|---|---|
| 2,181,002 | 11/1939 | Warner | 285—13 |
| 2,210,088 | 8/1940 | Longfield | 285—13 |
| 2,349,081 | 5/1949 | Douglass | 285—334.5 X |
| 2,366,010 | 12/1944 | Dies | 285—332 |
| 2,429,765 | 10/1947 | Moran | 285—13 X |
| 2,453,391 | 11/1948 | Whittingham | 285—14 |
| 2,793,830 | 5/1957 | Nakaji | 285—161 X |
| 3,377,087 | 4/1968 | Samerdyke | 285—14 |
| 3,402,703 | 9/1968 | Dickerson et al. | 123—32 |

FOREIGN PATENTS 836,825   6/1960   Great Britain.

REINALDO P. MACHADO, Primary Examiner

D. W. AROLA, Assistant Examiner

U.S. Cl. X.R.

123—32; 285—158